(12) United States Patent  
Callahan et al.

(10) Patent No.: US 8,874,627 B2
(45) Date of Patent: Oct. 28, 2014

(54) ENUMERATING METADATA IN FILE SYSTEM DIRECTORIES

(75) Inventors: Michael J. Callahan, Vancouver, WA (US); Samuel Revitch, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 12/261,071

(22) Filed: Oct. 30, 2008

(65) Prior Publication Data

US 2010/0115011 A1 May 6, 2010

(51) Int. Cl.
G06F 17/30 (2006.01)

(52) U.S. Cl.
CPC .................. *G06F 17/30091* (2013.01)
USPC .......................................... 707/828; 707/822

(58) Field of Classification Search
USPC .................................................. 707/822, 828
See application file for complete search history.

(56) References Cited

U.S. PATENT DOCUMENTS

| | | | |
|---|---|---|---|
| 5,317,739 A | 5/1994 | Elko | |
| 5,940,813 A | 8/1999 | Hutchings | |
| 6,148,333 A | 11/2000 | Guedalia | |
| 6,175,900 B1 | 1/2001 | Forin | |
| 6,963,882 B1 | 11/2005 | Elko | |
| 7,100,089 B1 | 8/2006 | Phelps | |
| 7,243,115 B2 | 7/2007 | Manley | |
| 7,328,305 B2 | 2/2008 | Kleiman | |
| 7,533,137 B1 * | 5/2009 | Timpanaro-Perrotta et al. | 1/1 |
| 7,539,988 B1 | 5/2009 | Hersh | |
| 7,698,708 B1 | 4/2010 | Lent | |
| 7,873,619 B1 * | 1/2011 | Faibish et al. | 707/705 |
| 7,890,555 B2 | 2/2011 | Gunda | |
| 8,312,242 B2 | 11/2012 | Casper | |
| 2003/0158834 A1 * | 8/2003 | Sawdon et al. | 707/1 |
| 2003/0182389 A1 | 9/2003 | Edwards | |
| 2005/0246397 A1 | 11/2005 | Edwards | |
| 2005/0246612 A1 | 11/2005 | Leis | |
| 2006/0161678 A1 * | 7/2006 | Bopardikar et al. | 709/238 |
| 2006/0282471 A1 | 12/2006 | Mark | |
| 2006/0288026 A1 * | 12/2006 | Zayas et al. | 707/101 |
| 2007/0282977 A1 | 12/2007 | Yano | |
| 2008/0005133 A1 * | 1/2008 | Khalidi et al. | 707/100 |
| 2008/0133538 A1 | 6/2008 | Chavez | |
| 2008/0172430 A1 | 7/2008 | Thorstensen | |
| 2008/0275925 A1 | 11/2008 | Kimmel | |
| 2009/0019047 A1 | 1/2009 | Anderson | |
| 2009/0193122 A1 | 7/2009 | Krishamurthy | |
| 2009/0271456 A1 * | 10/2009 | Kushwah | 707/204 |
| 2010/0049754 A1 * | 2/2010 | Takaoka et al. | 707/205 |
| 2010/0057992 A1 | 3/2010 | Hahn | |
| 2010/0114849 A1 | 5/2010 | Kingsbury | |
| 2010/0115009 A1 | 5/2010 | Callahan | |
| 2010/0115011 A1 | 5/2010 | Callahan | |
| 2010/0125583 A1 | 5/2010 | Casper | |
| 2010/0131474 A1 * | 5/2010 | Zayas et al. | 707/691 |

FOREIGN PATENT DOCUMENTS

| WO | 2010050943 A1 | 5/2010 |
|---|---|---|
| WO | 2010050944 A1 | 5/2010 |

\* cited by examiner

*Primary Examiner* — Hosain Alam
*Assistant Examiner* — Jared Bibbee

(57) ABSTRACT

One embodiment is a method that stores metadata about files separately from directories for the files in storage devices and represents the directories as a tree structure in which entries refer to separate storage blocks that include the metadata with each of the separate storage blocks storing metadata for only a single file.

12 Claims, 4 Drawing Sheets

ENUMERATING METADATA IN FILE SYSTEM DIRECTORIES

CROSS-REFERENCE TO RELATED APPLICATIONS

This application relates to the following patent applications which are filed concurrently herewith and incorporated herein by reference: U.S. patent application Ser. No. 12/261,064 entitled ALLOCATING PRIORITIES TO PREVENT DEADLOCKS IN A STORAGE SYSTEM, U.S. U.S. Publication No. 2010/0114849; International Application No. PCT/US2008/081661 entitled CREATING SNAPSHOTS OF A FILE SYSTEM, International Publication No. W02010/050943; U.S. patent application Ser. No. 12/261,068 entitled MANAGING COUNTERS IN A DISTRIBUTED FILE SYSTEM, U.S. U.S. Publication No. 2010/0115009; International Application No. PCT/US2008/081664 entitled ONLINE CHECKING OF DATA STRUCTURES OF A FILE SYSTEM, International Publication No. W02010/050944; and U.S. patent application Ser. No. 12/261,069 entitled TRACKING MEMORY SPACE IN A STORAGE SYSTEM, U.S. Pat. No. 8,312,242.

BACKGROUND

Filesystems organize and track where data is stored in memory and where free or available space exists in memory. In addition to storing and tracking the actual data of a file, filesystems also store and track metadata associated with the file. The metadata provides information about the file, such as when the file was created or modified, access permissions, ownership of the file, etc.

Distributed or clustered filesystems can store thousands or even millions of files. These files and the corresponding metadata are distributed across a large number of storage devices, such as disk drives.

Managing such a large number of files is a difficult task. In order to acquire information about the files and metadata, large directories or trees are searched. Since this information is spread across many disks, these searches can be slow and process intensive.

Methods and systems to improve the efficiency of searching large file systems are needed.

DETAILED DESCRIPTION

Exemplary embodiments relate to systems and methods for efficient enumeration of metadata in file system directories.

In one embodiment, a file system manager calculates, determines, or counts all of the files in a directory or in a hierarchical tree of directories and simultaneously extracts metadata information about each file. The metadata about the files is separately stored from the directories that contain the actual files. For example, the metadata is stored in inodes, and the directories are separately stored on disks as tree structures. The directories include references to these inodes. In one exemplary embodiment, only one inode is stored in a single disk block.

One exemplary embodiment is a clustered file system in which many computers simultaneously access disk data. With exemplary embodiments, some performance problems are avoided since each inode is stored in a separate disk block (i.e., each inode is stored in its own disk block). Since storage blocks do not share different inodes, performance problems are avoided when different computers attempt to manipulate inodes of different files that happen to share a single disk block.

The following scenario exemplifies this performance problem. Assume a storage system wherein multiple different inodes are stored in a single disk block. A performance or contention problem can arise when different computers simultaneously attempt to access different inodes stored in the same disk block. Exemplary embodiments avoid such a contention since each inode is stored in a unique storage block.

Exemplary embodiments enable directory enumeration to be quickly performed in a clustered file system when only one file's metadata is stored per one file system block. The directories are represented as tree structures on a storage device (such as a disk drive). Entries in the tree structure refer to a separate block that includes the corresponding or associated metadata for the file in the directory. Each such block contains metadata for only one or perhaps few files.

Figure 1:
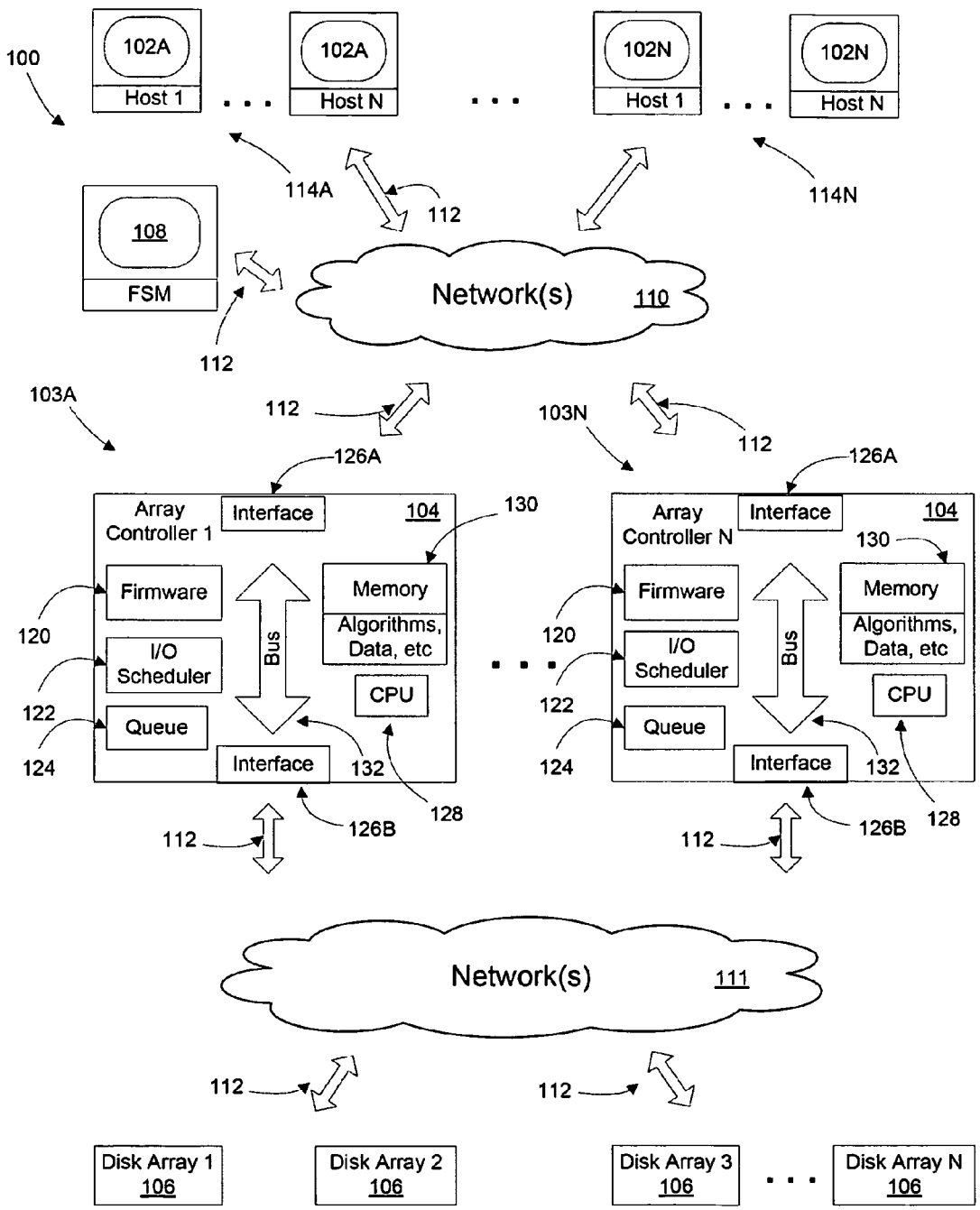
FIG. 1 shows a cluster file system in accordance with an exemplary embodiment of the present invention.

FIG. 1 shows a distributed or cluster file storage system 100 in accordance with an exemplary embodiment of the present invention. By way of example, the system is a cluster storage network and/or a storage area network (SAN) that includes a plurality of client computers, nodes, or host computers 102A to 102N and one or more storage devices or arrays 103A to 103N that include one or more storage controllers 104 (shown by way of example as an array controller), a plurality of storage devices 106 (shown by way of example as disk array 1 to disk array N), and a file system manager (FSM) 108 in communication with the storage controllers and devices. The filesystem manager 108 (such as a server or storage device) stores and organizes computer files so the files and corresponding data can be managed and discovered for the hosts 102A to 102N. In one exemplary embodiment, the filesystem manager 108 is replicated on all cluster nodes.

The host computers are grouped to form one or more clusters (shown as cluster 114A to 114N). For example, hosts 102A are grouped to form a one cluster 114A which includes a plurality of host computers (shown as host 1 to host N). Hosts 102N are grouped to form another cluster 114N.

The clusters 114A to 114N and file system manager 108 are coupled to the array controllers 104 through one or more fabrics or networks 110, and the storage devices or arrays 103 are coupled to the storage devices 106 through one or more fabrics or networks 111. For instance, the hosts communicate with an array controller using a Small Computer System Interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the storage devices (such as array controller 104 and disk arrays 106) are network attached devices providing random access memory (RAM) and/or disk space (for storage and as virtual RAM) and/or some other form of storage or storage device, such as magnetic memory (example, tapes), micromechanical systems (MEMS), or optical disks, to name a few examples. Typically, storage devices include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the storage devices include one or more servers.

The storage controller 104 manages various data storage and retrieval operations. Storage controller 104 receives I/O requests or commands from the host computers 102A to 102N, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache).

CPU 128 performs operations and tasks necessary to manage the various data storage and data retrieval requests received from host computers 102A to 102N. For instance, processor 128 is coupled to a host interface 126A that provides bidirectional data communications to one or more host computers 102A to 102N. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

Figure 2:
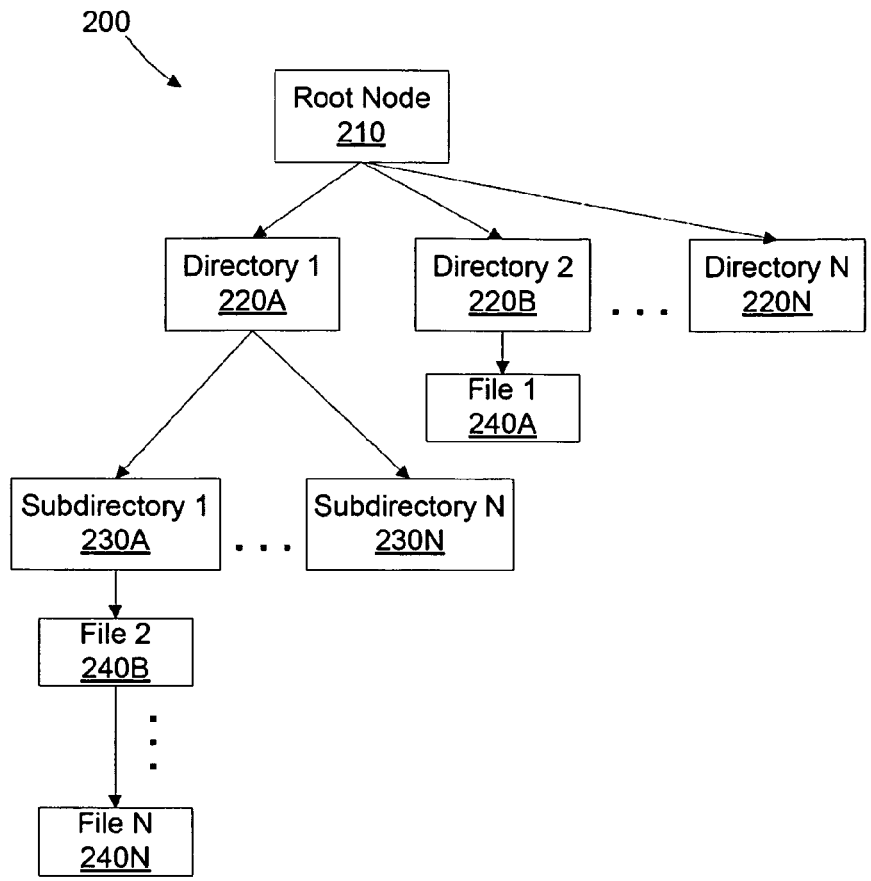
FIG. 2 shows a directory for a file system in accordance with an exemplary embodiment of the present invention.

FIG. 2 shows a partial directory or hierarchical tree structure 200 for a file system in accordance with an exemplary embodiment of the present invention. The directory includes a root node 210 with branches leading to a plurality of directories 220A, 220B, to 220N (shown as directory A to directory N). Directory 220A includes plural subdirectories 230A to 230N (shown as subdirectory 1 to subdirectory N). Each subdirectory further includes one or more files. For example, directory 220B has file 240A, and subdirectory 230A has files 240B to 240N (shown as file 2 to file N).

In one exemplary embodiment, each file contains a reference to a separate data structure that stores metadata about the file. For example, each file contains an inode number or inode reference number that refers to a block storing the inodes.

Figure 3:
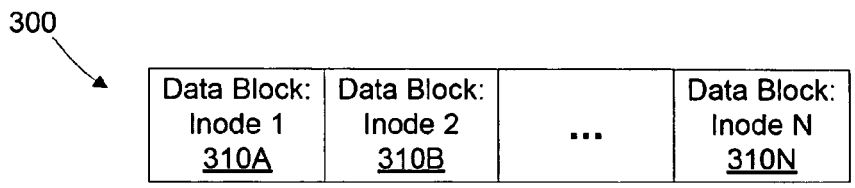
FIG. 3 shows storage blocks for a file system with a single inode in each block in accordance with an exemplary embodiment of the present invention.

FIG. 3 shows a data structure 300 of blocks 310A, 310B, to 310N for a file system with a single inode in each block in accordance with an exemplary embodiment of the present invention. Each block stores a single, separate inode with metadata corresponding to a file in the directory 200. For example, data block 310A stores inode 1 which can correspond to one of the files (such as file 240B) in the directory.

Figure 4:
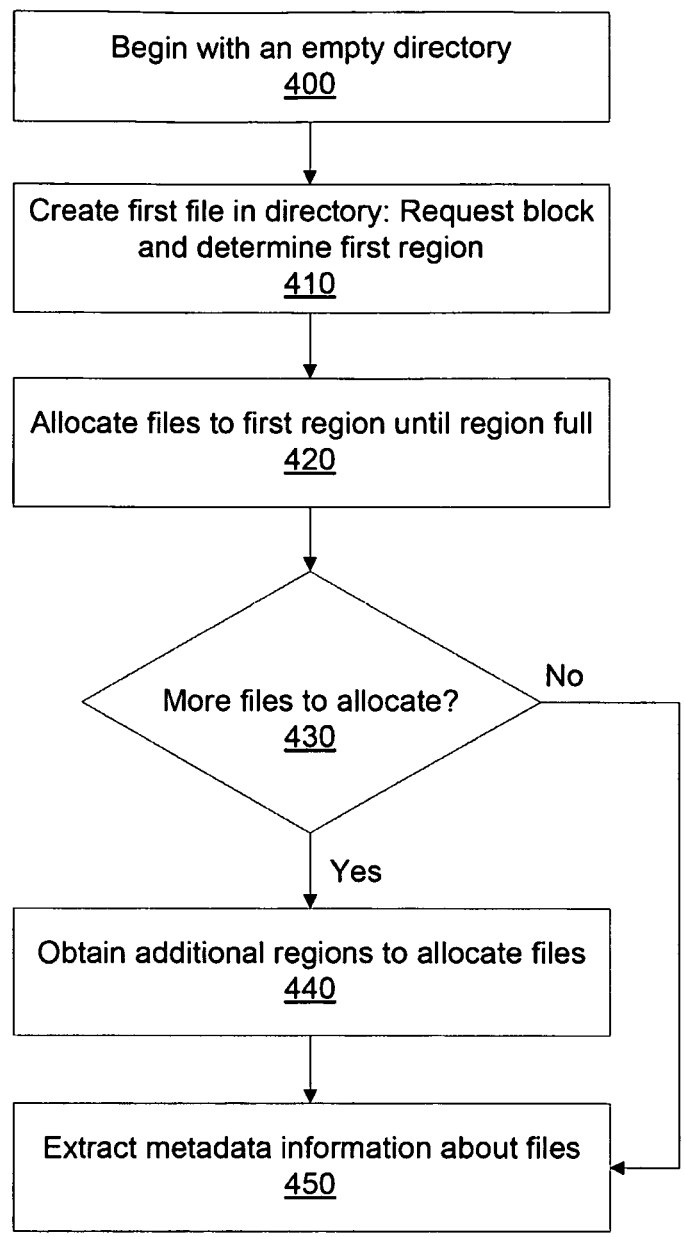
FIG. 4 is a flow diagram to layout inode blocks and to extract metadata information about files in accordance with an exemplary embodiment of the present invention.

FIG. 4 is a flow diagram to layout inode blocks and to extract metadata information about files in accordance with an exemplary embodiment of the present invention. FIG. 4 provides a process to enumerate efficiently files in a directory and extract metadata from corresponding inodes. Exemplary embodiments design or layout directories and inode blocks (which contain metadata or stat data) in a way so such data is quickly and efficiently retrieved from a storage device, such as a hard disk. For example, metadata is stored in inodes with consecutive inode number being in contiguous or consecutive storage blocks.

When files in a directory are known ahead of time (i.e., before mapping of the inode blocks), inode roots are placed in consecutive blocks and organized according to inode numbers to achieve an optimal layout (for example, stored in consecutive storage blocks with numerically consecutive increasing inode numbers: 1, 2, 3, 4, etc.). Of course, such a layout is not always possible since the files in the directory are not known ahead of time. Typically, files are created in a random order over an unpredictable period of time. In this instance, exemplary embodiments regard the set of inodes whose key values or inode numbers appear in a given directory block as a set that is allocated close together (for example, in an approximate contiguous numerical order).

In FIG. 4, the steps or blocks are provided with some exemplary numbers merely to illustrate a discussion of an exemplary embodiment. Further, all inodes in a given directory block are not required to be contiguous. In one embodiment, enough inodes should be contiguous to improve over all enumeration performance (for example, read directory+stat performance).

For discussion, assume the following: directory blocks have a size of 4K, the average filename length is 16 characters, and tree overhead means that roughly 50 file entries fit in a given directory block. Also, assume that the fan-out of the tree (in case the directory grows beyond a single block) is 50.

According to block 400, the process begins with an empty directory.

According to block 410, a first file is created in the directory. A block is requested, and the first region is determined. For example, to create the first file in the directory, the process asks a block allocator for a 4K block that is in a contiguous free region of 128K. The process does not actually allocate this 128K region, but preferentially locates a block at the start of one such region.

According to block 420, files are allocated to the first region until the region is full. After the first file is allocated, the next 15 files also get allocated from this region. Although the first 16 files will not be laid out exactly in order on disk, nonetheless a process performing an enumeration or scan (for example, a read dir+stat) should be able to detect the collocation and perform a single 128K read.

According to block 430, a question is asked whether more files need to be allocated. If the answer to this question is "yes" then flow proceeds to block 440 and additional regions are obtained to allocate files. For example, the 17th file grabs a new 128K region, and then subsequent new files draw from that region. With 32 files, two 128K reads are sufficient to retrieve inode data. In general, from 1 to 50 files, the process is able to perform a complete ls-l with just 1+ceil (numfiles/16) seeks (which is a significant improvement over 1+numfiles seeks).

According to block 450, metadata information is extracted from files. A call or request is made to enumerate files in a directory or tree of directories. For example, in Linux or Unix systems, a program is executed to traverse a file system with a stat system call. This call extracts information such as time of last modification, time of last status change, and time of last access. Such information is used to detect whether or when a file changed. As another example, in a Windows operating system, an Application Program Interface (API) enumerates files in a directory and provides certain items of metadata about the files, such as last-modified times.

Exemplary embodiments also apply to the situation when the directory grows beyond 50 entries and the directory block splits. With a fan-out of 50, a two-level directory B tree will store up to 50*50=2500 files. The first 50 files are randomly arranged among these 2500 files. In traversing such a large directory, the process may no longer "see" enough of the directory at any time to discover that the original 50 inodes were, in fact, contiguous. In this situation, even if the process does not make this detection (hence giving up the opportunity to stat those files in a seek-frugal fashion), most of the files are ones that originated in the two-level directory. The process will still execute an improved enumeration on those files and hence provide a significant improvement. Improvements in enumeration are gained as long as the process obtains near-contiguous allocation schemes within each leaf.

Discussion is now directed to characteristics of the leaves in the directory. When the first split of the directory block occurs, the process starts with a full block of 50 entries, which come in 4 groups: three full groups of 16 inodes taking up a 128K region, and one 128K region that only has a couple inodes yet allocated. After the split, the 50 entries are distributed across two directory leaf nodes. It is difficult to predict how many of the inodes from each of these four contiguity groups are in each leaf. Nonetheless, the process can still examine a directory leaf block and figure out where to allocate the next inode. If the whole directory fits in a single block, the process surveys everything. After the split, however, it might be difficult or time consuming to find the right place to go. One exemplary embodiment resolves this search by recording the allocation hint in the directory as a new item type (referred herein as a "seed").

Figure 5:
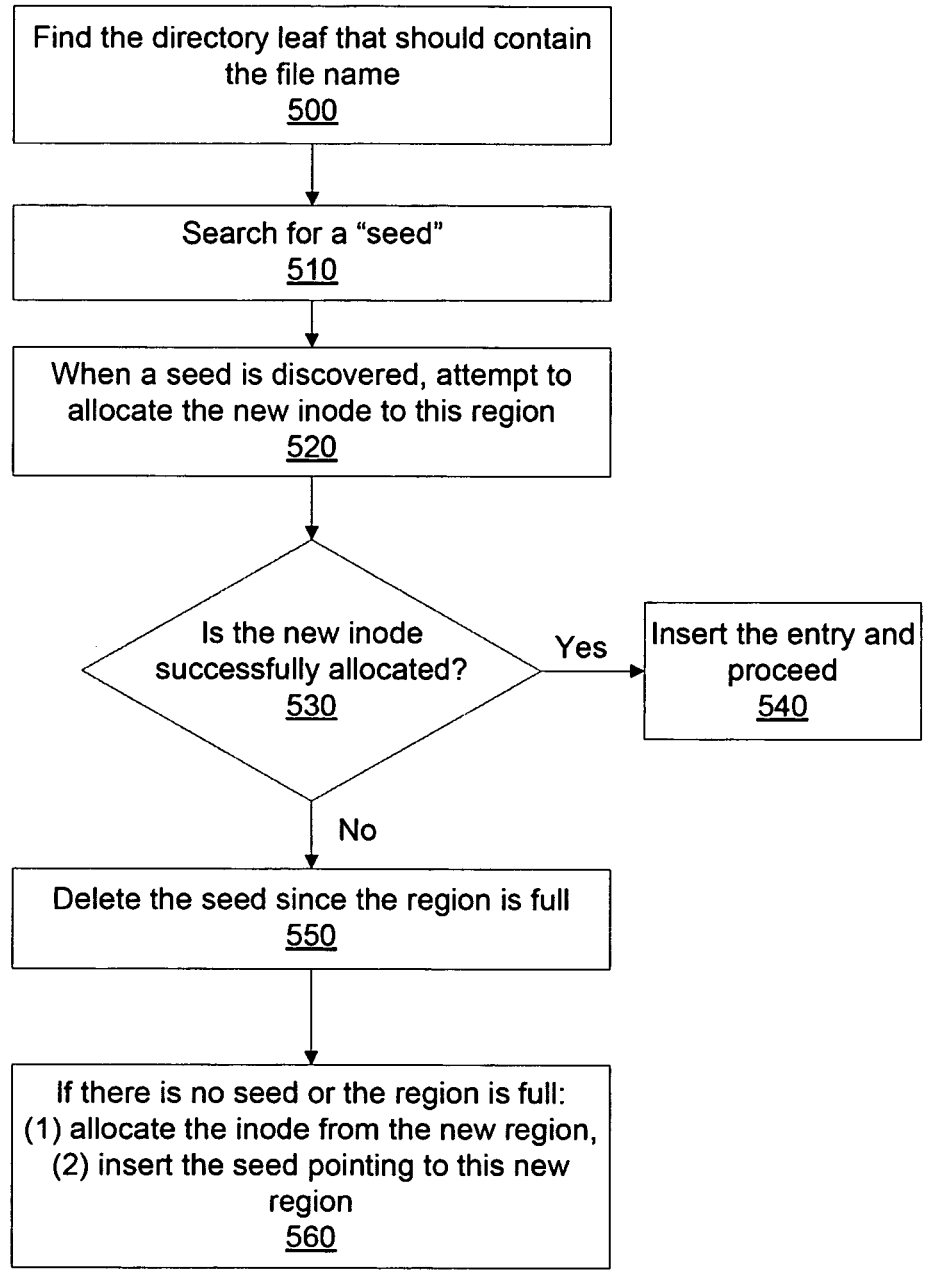
FIG. 5 shows a flow diagram for examining a directory leaf block and determining where to allocate a next inode in accordance with an exemplary embodiment of the present invention.

FIG. 5 shows a flow diagram for examining a directory leaf block and determining where to allocate a next inode.

According to block 500, to create a new file, first find the directory leaf that should contain the file name.

According to block 510, search for a "seed" item by starting at the file name and looking "left" to lower values. For this kind of search, do not traverse left in the tree if no item is found (this would require a search on "key-less-than-or-equal and specified-item-type).

According to block 520, when a seed is discovered, attempt to allocate the new inode to this region.

According to block 530, a question is asked whether the new inode is successfully allocated. If the answer to this question is "yes" then insert the entry and proceed according to block 540. If the answer to this question is "no" then flow proceeds to block 550.

According to block 550, delete the seed since the region is full.

According to block 560, If there is no seed or the region is full, then (1) allocate the inode from the new region, and (2) insert the seed pointing to this new region at the leftmost value this leaf covers.

In one exemplary embodiment, when a node splits, one of the daughters inherits the existing seed. Here, the new daughter will create one of its own seeds which allow the created node to accumulate a set of contiguous entries as it fills.

Exemplary embodiments enable a file system to use individual blocks to store file metadata. Such storage improves performance for many workloads in a clustered file system while simultaneously enabling good performance for directory enumerations.

Definitions

As used herein and in the claims, the following words are defined as follows:

A "B-tree" is a tree data structure in a database that sorts data and enables searches, insertions, and deletions to occur in logarithmic amortized time. Internal nodes have a variable number of child nodes with all leaf nodes being maintained at a same depth for balance.

A "block" is a sequence of bytes or bits having a specified length or block size. Data is blocked (i.e., placed into blocks) to facilitate handling streams of data since data is typically read as a single block at a time. Most file systems are based on block devices that store and retrieve specified blocks of data. For example, a single file can be stored in multiple blocks.

A "block device" refers to a device through which the file system moves data in the form of blocks. Block devices are addressable device nodes, such as hard disks, CD-ROM, or memory regions.

A "cluster" is a group of two or more computers that work closely together so that in many respects form a single computer. For examples, a cluster is formed by linking multiple computers through a fast local area network (LAN) to improve performance and/or availability over a single computer.

A "data storage block" or "storage block" refers to specific areas in memory, such as a hard disk. For example, one data storage block is a collection of eight sectors or 4,096 bytes, referred to as 4K bytes.

A "filesystem" or "file system" is a collection of file data, maintained by a filesystem implementation which is a set of data types, methods, and algorithms (typically implemented within an operating system instance) that store, organize, and maintain file data, frequently in some kind of file and/or directory hierarchy (albeit various alternatives and choices exist in the exact organizational structure made manifest by the filesystem implementation to the consumers of the file data). The actual file data and associated filesystem meta-data which describe the location, layout, directory organization, etc. of all file data within the filesystem is in turned stored on a data storage device (e.g., single hard disk, CD-ROM, disk storage array, network attached storage (NAS), etc.).

A "directory" is an entity in a file system that contains a group of files or other directories. Related files are typically stored in a same directory. A directory contained inside a directory is a subdirectory. Together, multiple directories form a hierarchy or tree structure.

An "inode" is a data structure that contains information about files (such as basic information about a regular file, directory, or other file system object). Inodes include information on files, such as, but not limited to, user ownership, access mode (read, write, execute permissions) and type. In one exemplary embodiment, each file has an inode and is identified by an inode number (i-number) in the file system where it resides. Inodes contain metadata (i.e., data about data) about the file.

The term "inode number" refers to an i-number that identifies where a file resides in the file system. The inode number indexes a table of inodes in a known location on the storage device. The kernel uses the inode number to access the contents of the inode. For example, the inode number for a file is found using a 1s-i command (compared with a 1s-1 command which retrieves information of time of last modification). Some file systems do not implement a table of inodes but store such data to locate the inodes. The data can be called stat data (in reference to a stat system call that provides the inode information to a requesting program).

The term "metadata" refers to data about data. Metadata can be stored in a separate file apart from the data itself. For example, file systems can store metadata in directory entries or in specialized structures, such as inodes. By way of example, metadata can include length of data stored as the number of blocks allocated for the file, a time and date when the file was modified, created, or last accessed, ownership identification, access permissions, etc.

A "storage device" refers to any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. For example, the software is implemented as one or more modules. The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   storing metadata about files separately from directories for the files in storage devices in a cluster file system;
   representing the directories as a tree structure in which entries refer to separate storage blocks that include the metadata with each of the separate storage blocks storing metadata for only a single file;
   storing the metadata in inodes with each of the separate storage blocks including only one corresponding inode; and
   enumerating the files in the directories while extracting some of the metadata about the files.

2. The method of claim 1 further comprising, traversing the tree structure to extract a time when at least one of the files was last modified.

3. The method of claim 1 further comprising, storing the metadata in the inodes with consecutive inode numbers being in contiguous storage blocks.

4. The method of claim 1 further comprising, storing the metadata in consecutive storage blocks to increase efficiency of traversing the directories to enumerate the files.

5. A non-transitory computer readable storage medium having instructions for causing a computer to execute a method, comprising:
   storing metadata about files as inodes in storage blocks in a cluster file system with the inodes being arranged by increasing inode number in consecutive storage blocks, wherein each of the storage blocks includes only a single inode; and
   enumerating the files in a tree structure and extracting some of the metadata about the files.

6. The non-transitory computer readable storage medium of claim 5, wherein the instructions are to further cause the computer to arrange the files in the tree structure with the files containing reference numbers that refer to the storage blocks.

7. The non-transitory computer readable storage medium of claim 5, wherein the instructions are to further cause the computer to traverse the tree structure to extract information from the metadata to determine a last time at least one of the files was changed.

8. The non-transitory computer readable storage medium of claim 5, wherein the instructions are to further cause the computer to store new inodes in consecutive storage blocks to increase efficiency in traversing the tree structure and gathering metadata about the files.

9. A server, comprising:
   a memory;
   a processor coupled to the memory; and
   a file system manager coupled to the processor, the file system manager to store metadata about files separately from directories for the files in storage devices and to represent the directories as a tree structure in which entries refer to separate storage blocks that include the metadata with each of the separate storage blocks storing metadata for only a single file, wherein the metadata is stored in inodes with each of the separate storage blocks including only one corresponding inode.

10. The server of claim 9, wherein the storage devices are distributed in a cluster file system.

11. The server of claim 9, wherein the metadata is stored in the inodes with consecutive inode numbers being in consecutive storage blocks.

12. The server of claim 9, wherein the metadata is stored in consecutive storage blocks to increase performance of searching the directories to enumerate the files.

\* \* \* \* \*

UNITED STATES PATENT AND TRADEMARK OFFICE
CERTIFICATE OF CORRECTION

PATENT NO. : 8,874,627 B2  Page 1 of 1
APPLICATION NO. : 12/261071
DATED : October 28, 2014
INVENTOR(S) : Callahan et al.

It is certified that error appears in the above-identified patent and that said Letters Patent is hereby corrected as shown below:

In the Specification

Column 1, line 11, delete "U.S. U.S." insert -- U.S. --, therefor.

Column 1, line 16, delete "W02010" insert -- WO2010 --, therefor.

Column 1, line 18, delete "U.S. U.S." insert -- U.S. --, therefor.

Column 1, line 22, delete "W02010" insert -- WO2010 --, therefor.

Signed and Sealed this
Seventeenth Day of March, 2015

Michelle K. Lee
*Director of the United States Patent and Trademark Office*